(12) United States Patent
Fenile et al.

(10) Patent No.: US 11,878,876 B2
(45) Date of Patent: Jan. 23, 2024

(54) DEVICE FOR EMPTYING TRANSPORT BAGS CONVEYED IN A SUSPENDED MANNER

(71) Applicant: FERAG AG, Hinwil (CH)

(72) Inventors: Roberto Fenile, Wetzikon (CH); Erwin Stauber, Grüt (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 17/689,548

(22) Filed: Mar. 8, 2022

(65) Prior Publication Data

US 2022/0332520 A1 Oct. 20, 2022

Related U.S. Application Data

(63) Continuation-in-part of application No. 16/481,212, filed as application No. PCT/IB2018/050446 on Jan. 25, 2018, now Pat. No. 11,267,658.

(30) Foreign Application Priority Data

Jan. 31, 2017 (CH) ..................................... 00109/17

(51) Int. Cl.
*B65G 47/60* (2006.01)
*B65G 17/20* (2006.01)
(Continued)

(52) U.S. Cl.
CPC ............. *B65G 47/61* (2013.01); *B65G 47/40* (2013.01); *B65G 47/44* (2013.01)

(58) Field of Classification Search
CPC ........ B65G 17/20; B65G 47/40; B65G 47/44; B65G 47/60; B65G 47/61
(Continued)

(56) References Cited

U.S. PATENT DOCUMENTS 2,609,082 A 9/1952 Leach
2,643,761 A 6/1953 Wagner et al.
(Continued)

FOREIGN PATENT DOCUMENTS

AT 520412 A1 3/2019
DE 1 175 153 B 7/1964
(Continued)

*Primary Examiner* — Douglas A Hess
(74) *Attorney, Agent, or Firm* — Pauley Erickson & Swanson

(57) ABSTRACT

A device for emptying transport bags conveyed in a suspended manner, includes a conveying system via which transport bags may be supplied in a suspended manner along a conveying path. The transport bags have a pocket that is open at the top when in the filled state and a front side. A circulating conveyor belt for receiving piece good units transported in the transport bags is included, and in a contact section, the conveying paths of the conveying system and the conveyor belt are situated relative to one another in such a way that the distance between the conveying paths of the conveying system and the conveyor belt become continuously smaller, so that when a transport bag is conveyed along the contact section, the front side of the pocket of the transport bag contacts and comes to rest on the conveyor belt, and the transport bag is thereby pivoted backwards.

18 Claims, 10 Drawing Sheets

(51) Int. Cl.
*B65G 47/61* (2006.01)
*B65G 47/44* (2006.01)
*B65G 47/40* (2006.01)

(58) Field of Classification Search
USPC .................................................. 198/680, 681
See application file for complete search history.

(56) References Cited

U.S. PATENT DOCUMENTS

| | | | |
|---|---|---|---|
| 2,992,721 | A | 7/1961 | Eger |
| 4,144,538 | A | 3/1979 | Chapman et al. |
| 4,318,807 | A | 3/1982 | Maki-Hoimela et al. |
| 4,508,484 | A | 4/1985 | Heiz |
| 4,805,780 | A | 2/1989 | Sølund |
| 5,125,500 | A | 6/1992 | Cailbault |
| 5,799,769 | A | 9/1998 | Heer et al. |
| 6,464,067 | B1 | 10/2002 | Reist |
| 7,080,727 | B1 | 7/2006 | Sanderson |
| 8,151,973 | B2 | 4/2012 | Borkiewicz et al. |
| 8,505,712 | B2 | 8/2013 | Andreae et al. |
| 9,630,751 | B1 | 4/2017 | Otto |
| 9,815,635 | B2 | 11/2017 | Sieksmeier et al. |
| 10,005,616 | B2 | 6/2018 | Fenile et al. |
| 10,112,783 | B2 | 10/2018 | Stauber |
| 10,301,121 | B1 | 5/2019 | Hoffman et al. |
| 10,322,887 | B2 | 6/2019 | Fenile |
| 10,358,299 | B2 | 7/2019 | Ruge et al. |
| 10,633,195 | B2 | 4/2020 | Gadliger |
| 10,647,523 | B2 * | 5/2020 | Sigrist .................... B65G 9/004 |
| 10,875,716 | B2 | 12/2020 | Schönenberger |
| 10,954,079 | B2 * | 3/2021 | Ramseier ............... B65G 17/20 |
| 11,267,658 | B2 * | 3/2022 | Fenile .................... B65D 29/00 |
| 11,299,350 | B2 * | 4/2022 | Fenile .................... B65G 47/61 |
| 11,352,216 | B2 * | 6/2022 | Reischl ................ B65G 19/025 |
| 11,465,857 | B2 * | 10/2022 | Krauss .................... B65G 47/82 |
| 11,649,117 | B2 * | 5/2023 | Durtschi ................ B65G 47/38 |
| | | | 198/340 |
| 2003/0106774 | A1 | 6/2003 | Muller |
| 2010/0089722 | A1 | 4/2010 | Wiedemann et al. |
| 2012/0037272 | A1 | 2/2012 | Wend et al. |
| 2015/0225177 | A1 | 8/2015 | Schöneberger |
| 2017/0088302 | A1 | 3/2017 | Auf Der Maur |
| 2017/0341864 | A1 | 11/2017 | Stauber |
| 2017/0369248 | A1 | 12/2017 | Fenile |
| 2018/0208407 | A1 | 7/2018 | Ruge et al. |
| 2018/0215547 | A1 | 8/2018 | Fenile et al. |
| 2018/0244471 | A1 | 8/2018 | Keller et al. |
| 2018/0244488 | A1 | 8/2018 | Keller et al. |
| 2018/0312341 | A1 | 11/2018 | Keller et al. |
| 2018/0354728 | A1 | 12/2018 | Sigrist |
| 2019/0367282 | A1 | 12/2019 | Stauber |
| 2020/0024074 | A1 | 1/2020 | Herzog-Lang et al. |
| 2020/0189846 | A1 | 6/2020 | Sutter |
| 2021/0002079 | A1 | 1/2021 | Mäder |
| 2021/0171292 | A1 | 6/2021 | Fenile et al. |

FOREIGN PATENT DOCUMENTS

| | | |
|---|---|---|
| DE | 195 04 879 A1 | 8/1996 |
| DE | 10 2014 203 298 A1 | 6/2005 |
| DE | 103 54 419 A1 | 6/2005 |
| DE | 10 2004 018 569 A1 | 11/2005 |
| DE | 10 2008 026 720 A1 | 12/2009 |
| DE | 20 2012 012331 U1 | 1/2013 |
| DE | 10 2012 018925 A1 | 3/2014 |
| DE | 20 2017 105 508 U1 | 12/2017 |
| EP | 0 050 245 A1 | 4/1982 |
| EP | 2 130 968 A1 | 12/2009 |
| EP | 2 196 415 A2 | 6/2010 |
| EP | 3 575 246 A1 | 12/2019 |
| GB | 2 232 391 A | 12/1990 |
| JP | S46 11228 Y1 | 4/1971 |
| JP | S52-37381 U | 3/1977 |
| JP | S52-41873 U | 3/1977 |
| JP | S60-176868 U | 11/1985 |
| JP | H04 339744 A | 11/1992 |
| SU | 1 169 904 A1 | 7/1985 |
| WO | WO 90/03853 A2 | 4/1990 |
| WO | WO 2013/053747 A1 | 4/2013 |
| WO | WO 2015/124524 A1 | 8/2015 |
| WO | WO 2016/030275 A1 | 3/2016 |
| WO | WO 2017/202491 A1 | 11/2017 |
| WO | WO 2018/078098 A1 | 5/2018 |

* cited by examiner

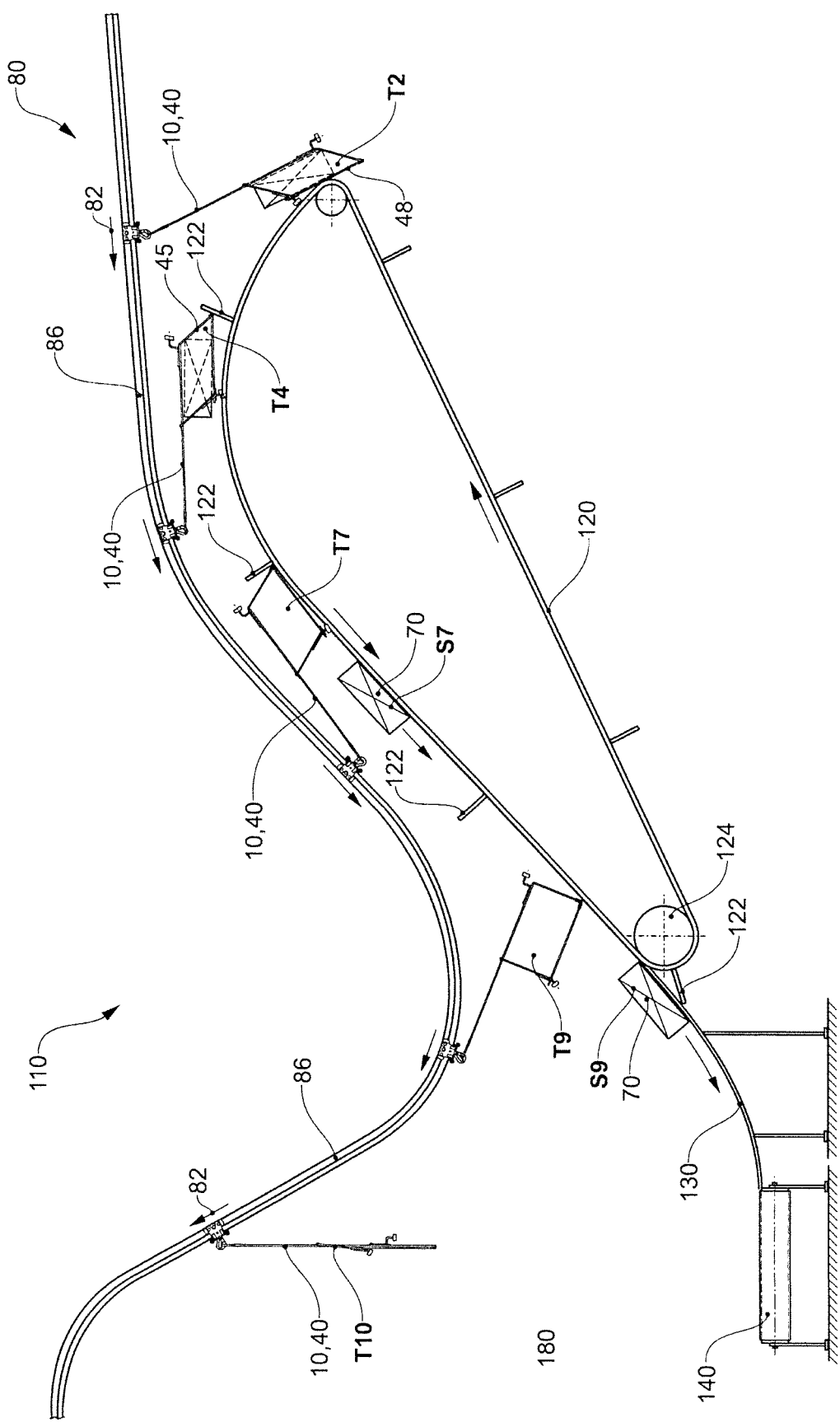

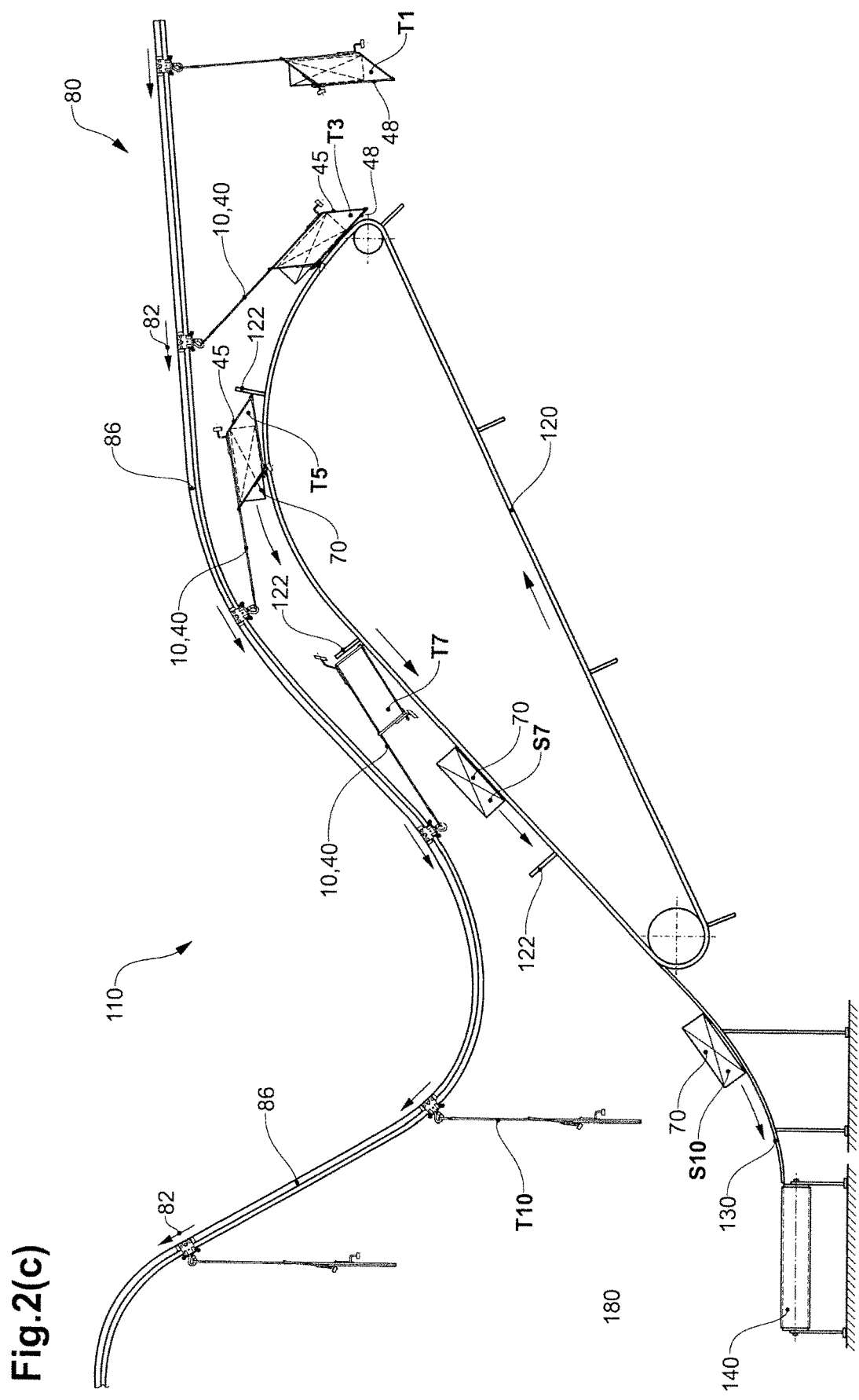

DEVICE FOR EMPTYING TRANSPORT BAGS CONVEYED IN A SUSPENDED MANNER

CROSS REFERENCE TO RELATED APPLICATIONS

This application is a continuation-in-part of U.S. patent application Ser. No. 16/481,212, filed on 26 Jul. 2019, which is a 371 National Phase Application filing of International Patent Application No. PCT/IB2018/050446, filed 25 Jan. 2018, which claims the priority of Swiss Patent Application No. CH 00109/17, filed 31 Jan. 2017 and Swiss Patent Application No. CH 00796/17, filed 20 Jun. 2017. The co-pending parent and related applications are hereby incorporated by reference herein in their entirety and are made a part hereof, including but not limited to those portions which specifically appear hereinafter.

BACKGROUND OF THE INVENTION

Field of the Invention

The present invention pertains to the field of transport and conveying technology and relates to a device for emptying transport bags conveyed in a suspended manner.

Discussion of Related Art

In automated warehouses, large production facilities, and in general in the conveying and transport of goods, suspension conveyor systems have proven to be an efficient means for the transport, intermediate buffer storage, and long-term storage of various types of goods. In suspension conveyor systems, the goods are either suitably suspended directly on individual conveying elements of a conveying system, or introduced into appropriate transport elements such as transport bags, which in turn are mounted in a suspended manner on the conveying elements.

Suspension conveyor systems may be implemented as transport chain facilities in which a plurality of conveying elements form links in a chain that is moved along a conveying path.

Also known are gravity-driven conveying systems in which individual conveying elements equipped with wheels move on corresponding rails. One example of such a gravity-driven, rail-guided conveying system is known from WO 2016/030275 A1 by the present applicant.

Suspension conveyor systems with transport elements are particularly suited for efficiently conveying heterogeneous piece good articles, for example workpieces in production processes, replacement parts, and consumer goods such as books, clothing, shoes, etc.

Thus, for example, suspension conveyor systems may be used in logistics centers of mail order companies for storing a plurality of articles of various sizes and weights, and for picking groups of articles according to the particular customer orders and providing them for shipment.

In this regard, one relevant aspect for a suspension conveyor system is simple, smooth, and efficient introduction of goods into empty transport elements and removing the goods from the transport elements.

Manual removal of the goods from the transport bags allows flexible handling of various goods, but is slow and costly.

There is a general need for improvements in this field of technology.

SUMMARY OF THE INVENTION

It is an object of the invention to provide a device for emptying transport bags that are conveyed in a suspended manner, which allows simple and efficient emptying of the transport bags.

This and other objects are achieved by a device according to the invention according to the independent claim. Further preferred embodiments are set forth in the dependent claims.

A device according to the invention for emptying transport bags conveyed in a suspended manner comprises a conveying system, in particular a rail-guided conveying system or a conveyor chain system, via which transport bags may be supplied in a suspended manner along a conveying path, the transport bags having a pocket that is open at the top when in the filled state, with a front side. The device further comprises a circulating conveyor belt for receiving piece good units transported in the transport bags. In a contact section, the conveying path of the conveying system and the conveying path of the conveyor belt are situated relative to one another in such a way that the distance between the conveying path of the conveying system and the conveying path of the conveyor belt becomes continuously or increasingly smaller, so that when a transport bag is conveyed along the contact section, the front side of the pocket of the transport bag contacts and comes to rest on the conveyor belt, and the transport bag is thereby swiveled or pivoted backwards. A chute adjoins the conveyor belt, such that piece good units present on the conveyor belt are subsequently further conveyed onto the chute, driven by gravity. A further conveyor that receives the piece good units from the chute.

The further conveyor may be realized as a horizontal conveyor. Particularly, the further conveyor may be realized as a belt conveyor, a shell conveyor, a roller conveyor, a trough conveyor, a cross-belt conveyor, or a horizontal sorter array.

An exemplary embodiment of a horizontal sorter array that may be used as a further conveyor is disclosed in US 2021/0002079 A1.

The further conveyor may be realized as a conveyor system comprising one or more independently movable carrier units for conveying the received piece good units to a certain destination point. Such an independently movable carrier unit may for example be realized as a carrier vehicle, in particular an autonomous carrier vehicle.

The further conveyor may comprise one or more receptacles for receiving piece good units from the chute, in particular containers or boxes.

The transport bags may be pivotably suspended on conveying elements of the conveying system.

Within the meaning of the present description, transport bags may be understood to mean any transport element that can be used within the meaning of the technical principle of the device according to the invention described below, for example transport boxes having stable walls, or lightweight rod assemblies with textile walls stretched in between, etc.

In such a device, the conveying path of the conveying system and the conveying path of the conveyor belt advantageously run essentially parallel to one another with a certain downward slope in a transfer section. During the conveying, the front side of the pocket of a transport bag continues to lie along the transfer section on the conveyor belt, so that the opening in the pocket of the transport bag is oriented obliquely downwardly, and piece good units that are present in the pocket of the transport bag, driven by gravity, slide from the pocket onto the conveyor belt.

The transfer section may adjoin the contact section and/or may partially overlap the contact section.

It is particularly advantageous that in the above-mentioned device, in a separating section the distance between the conveying path of the conveying system and the conveying path of the conveyor belt becomes continuously larger, so that during the conveying of a transport bag along the separating section, the emptied transport bag is lifted from the conveyor belt and swivels back into the freely suspended position.

The separating section may adjoin the transfer section and/or may partially overlap the transfer section.

In the above-mentioned devices, the conveying speeds of the conveyor belt and of the conveying system are advantageously the same.

The conveyor belt of the device advantageously has a plurality of outwardly directed transversal ribs that are uniformly spaced along the circumference of the conveyor belt.

In such a device, the position of the ribs and of the transport bags relative to one another is selected in such a way that in the contact section a rib catches up with the transport bag, contacts the base section of the transport bag, and pushes it forward in the conveying direction until the transport bag is transferred into a state for emptying.

The distance between the ribs is advantageously selected in such a way that during the conveying of a transport bag along the transfer section, piece good units that are present in the pocket of the transport bag, driven by gravity, slide from the pocket onto the conveyor belt, and slide further downwardly on the conveyor belt with assistance from gravity until they are intercepted and held by the rib preceding the transport bag.

In the above-mentioned devices, the ribs of the conveyor belt are advantageously made up of a plurality of parallel fingers.

In a particularly advantageous embodiment of such a device, an upper end of the chute adjoining the conveyor belt has slots whose positions correspond to the fingers of the ribs of the conveyor belt, so that when the conveyor belt is deflected, the fingers of the ribs and the slots of the chute intermesh with one another, and in each case piece good units held back behind a rib are released in a clocked manner and, driven by gravity, are subsequently further conveyed on the chute.

In such a device advantageously, the further conveyor receives the released piece good units from the chute.

In the above-mentioned devices, vibration means are advantageously provided, via which the surface of the conveyor belt may be set in vibration or oscillation, at least in a partial section of the conveyor belt.

Such vibrations or oscillations may assist gravity in freeing possibly jammed goods from the pocket of the transport bag, and/or may assist with the sliding of the goods on the conveyor belt to the next underlying rib.

The transport bags of one of the above-mentioned devices advantageously have a reinforced rear wall.

The transport bags of one of the above-mentioned devices advantageously include a rear wall and a front wall that are flexibly joined together via a base section in such a way that they are movable back and forth between a first state in which they form a pocket that is open and fillable at the top, and a second state in which they are situated close together and form a folded-up bag.

The rear wall of the transport bag is particularly advantageously extended upwardly beyond the level of the front wall, with a support section for fastening the transport bag to the conveying element.

BRIEF DESCRIPTION OF SEVERAL VIEWS OF THE DRAWINGS

Reference is made below to the drawings for better understanding of the present invention. The drawings show embodiments of the inventive subject matter strictly by way of example.

Identical or functionally equivalent parts in the figures and the associated description are provided with the same reference numerals.

DETAILED DESCRIPTION OF THE INVENTION

Figure 1A:
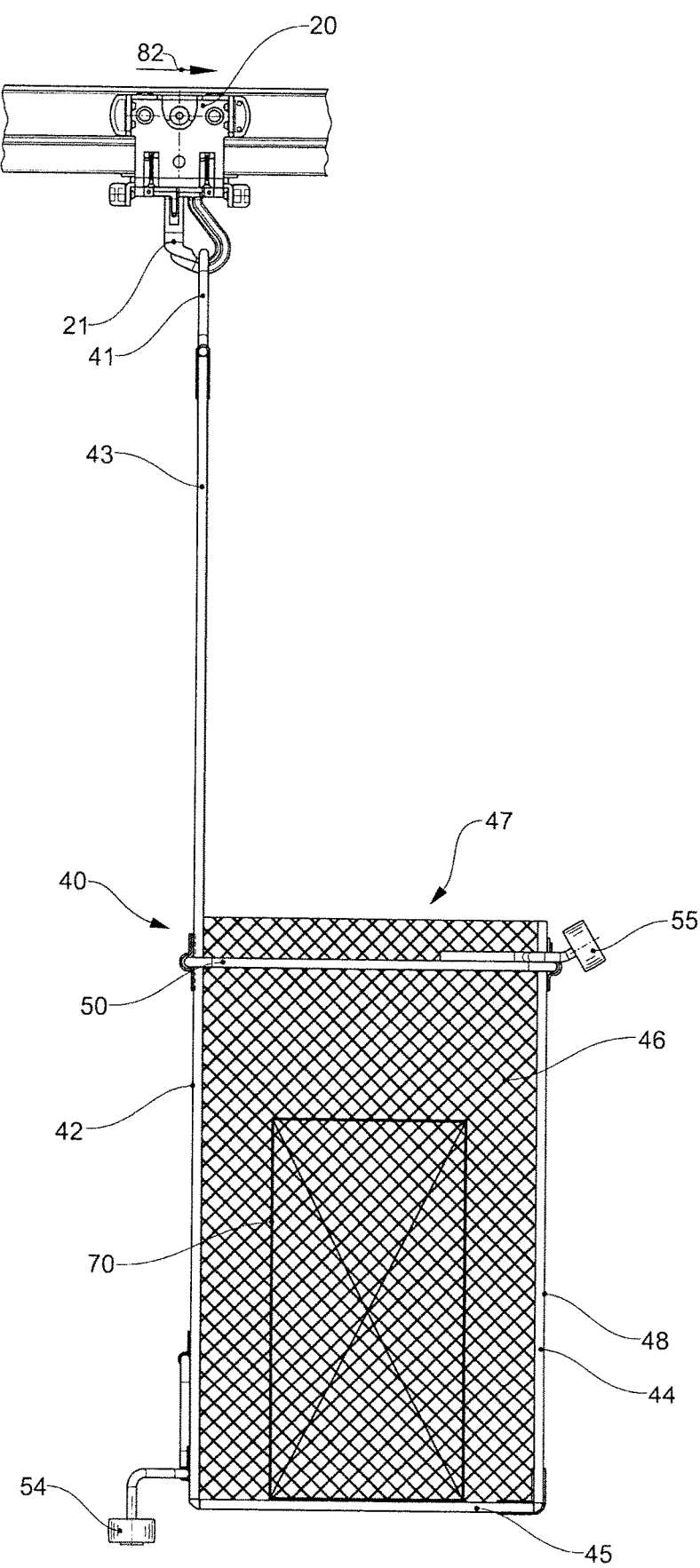
FIG. 1 schematically shows a disclosed conveying unit of a conveying system, having a transport bag transverse to the conveying direction, filled with a piece good unit, (a) in a side view of the transport bag with the conveying direction toward the right; (b) in an oblique view of the transport bag from the rear; and (c) in a rear view of the transport bag, looking in the conveying direction.
Figure 1B:
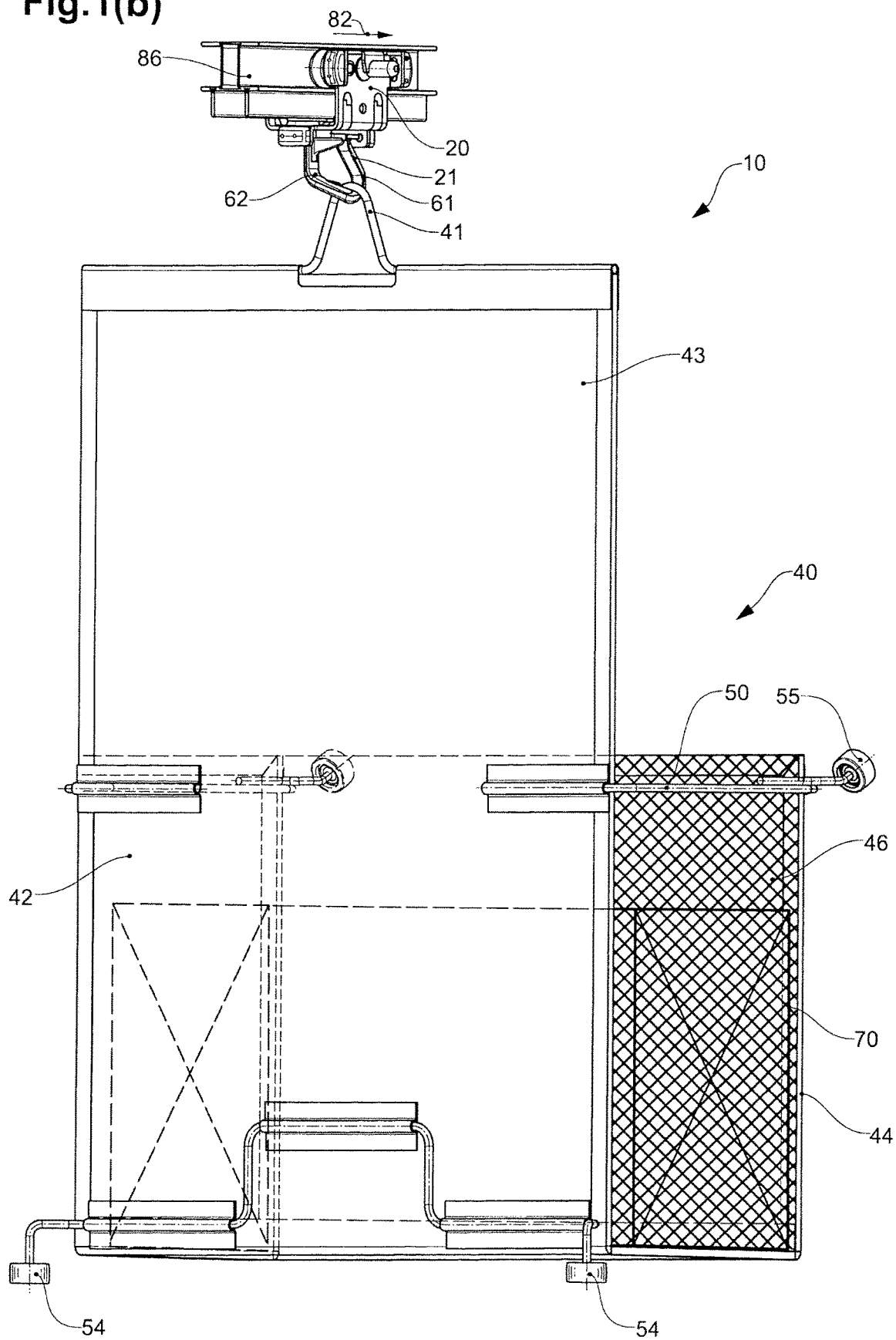
Figure 1C:
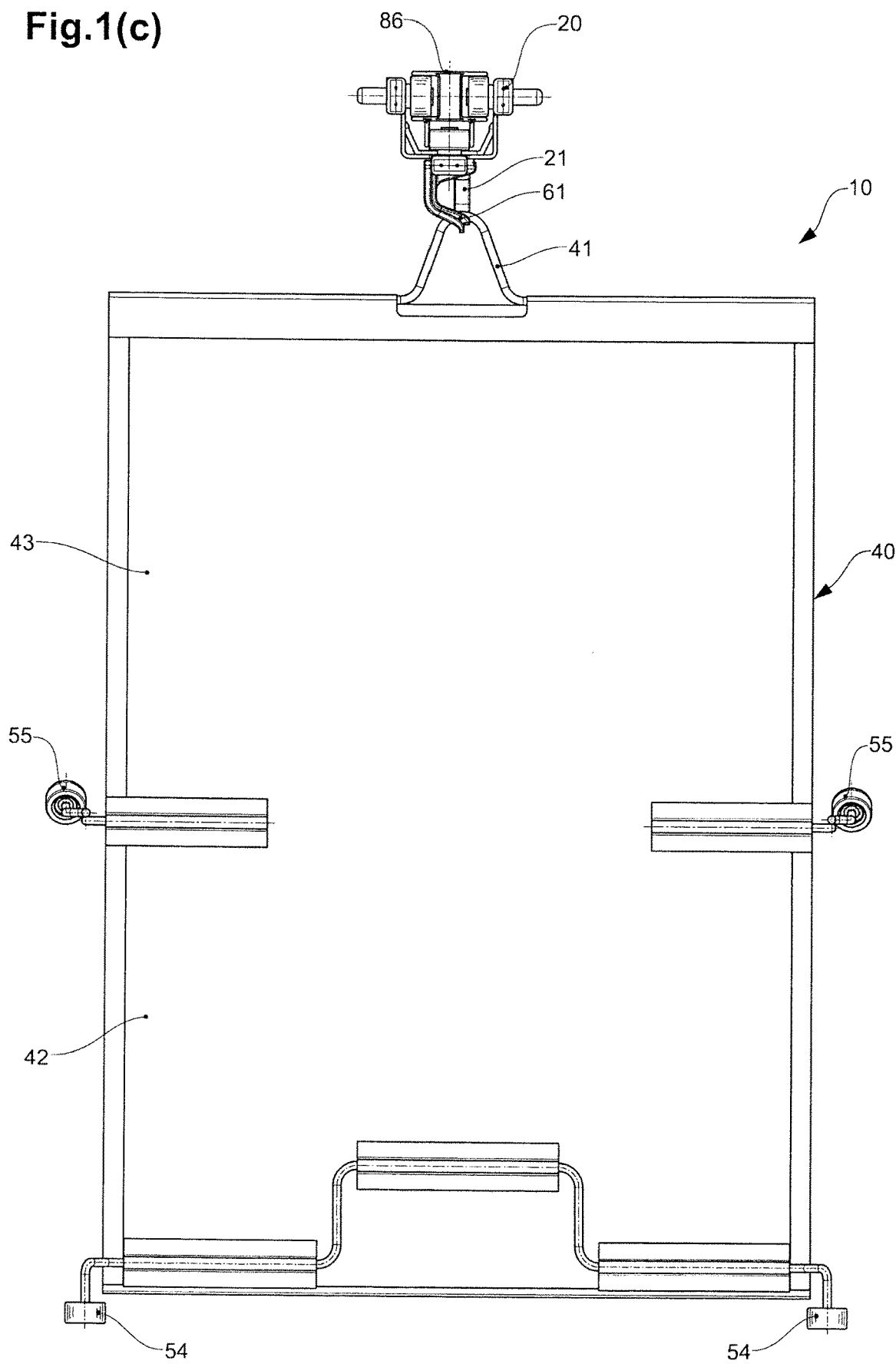

A conveying unit 10 that may be used in a device according to the invention for emptying transport bags conveyed in a suspended manner is illustrated in FIG. 1. A transport element 40 in the form of a transport bag has a suspension hook 41 that is suspended in a support hook 21 of a conveying element 20. In the example shown, the conveying element is a trolley or carriage of a gravity-driven suspension conveyor facility, analogous to a suspension conveyor facility as disclosed, for example, in WO 2016/030275 A1 by the present applicant. For better understanding, the carriage 20 is illustrated on a rail 86 of a conveying system, where it moves in an intended conveying direction 82.

The transport bag includes a front wall 44, a base section 45, and a rear wall 42 that are pivotably connected at the abutting edges. The front wall, rear wall, and base section have a stable design, and may be made, for example, of a suitable plastic material such as a hollow profile panel. Flexibly designed side walls 46 connect the front wall, rear wall, and base section, resulting in a pocket 47 with an opening into which at least one piece good unit 70 may be loaded. In the example shown, the side walls are made of a fine-mesh net. It is also possible to use a flexible textile material. The side walls 46 are designed in such a way that when the transport bag is folded up, they are likewise folded up, as described below.

A pivotably fastened spacer 50 in the form of a wire bracket is situated on each side, between the front wall 44 and the rear wall 42. The spacers 50 are situated essentially parallel to the base section 45 and have the same length as the base section, and the front wall 44 is situated essentially parallel to the rear wall 42, so that the rear wall 42, spacer 50, front wall 44, and base section 45 form a parallelogram.

In the unloaded state, the weight of the front wall and the base section may drop the front wall downwardly, so that the transport bag goes into a second state in which the front wall and the rear wall are close to one another.

In this configuration the transport bag may be kept in a conveying system in a space-saving manner by lining up the conveying units flush on a rail, one behind the other.

The transport bag may be transferred from the second, folded-up state into a first, unfolded state by raising the front wall 44 and/or the base section 45 with respect to the rear wall 42, as shown in FIG. 1. The upwardly directed opening in the pocket 47 of the transport bag 40 is now in a read-to-fill state.

In the exemplary embodiment shown, a piece good unit, schematically illustrated by a cuboidal object 70, is situated in the pocket 47 of the transport bag 40.

Two guide rollers 54 are situated at a lower end of the rear wall 42. The guide rollers may be used to additionally move the transport bag 40 during the conveying in a conveying system when the transport bag is being displaced along the conveying direction 82, for example by guiding one or both guide rollers in a connecting link. Similarly, the two guide rollers 55 mounted at an upper end of the front wall 44 may be used to raise the front wall 42.

The rear wall 42 at its upper end is extended into a support section 43, at the upper end of which the suspension hook 41 in the form of a wire bracket is pivotably connected to the rear wall 42 or the support section 43 thereof. The bracket of the suspension hook 41 defines an orientation plane of the suspension hook, and thus, of the entire transport bag.

The support hook 21 is mounted on a lower end of the carriage 20 facing away from the rail 86. The support hook may be made of metal or a suitable polymer material, for example a glass fiber-reinforced thermoplastic material. In the illustration in FIG. 1, the suspension hook 41 is in a stable position in which the suspension hook is supported where the potential energy is at a minimum. In this stable position, the suspension hook 41 is oriented in a plane transverse to the conveying direction 82, and a front side 48 of the pocket of the transport bag faces in the conveying direction 82.

Figure 2A:
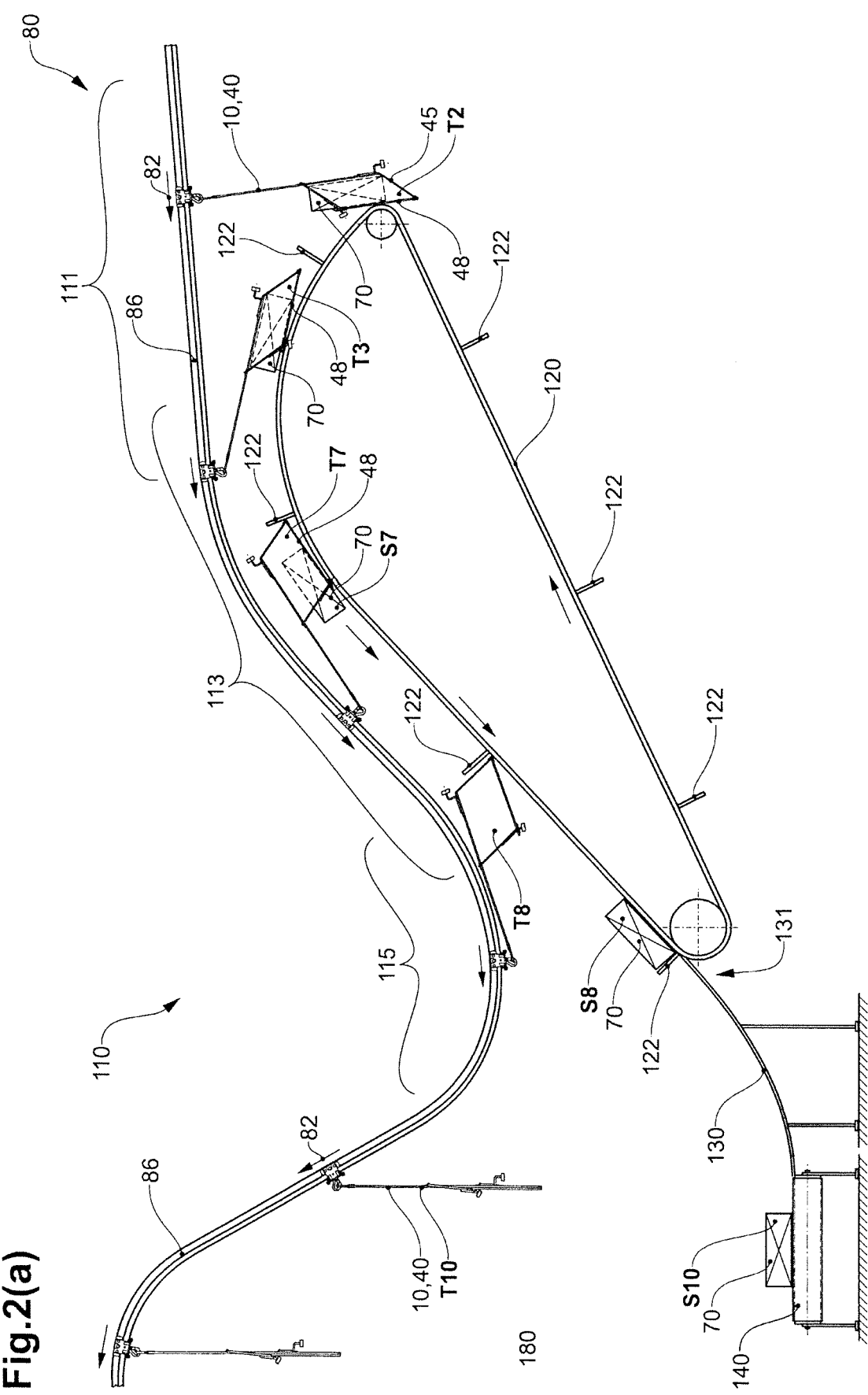
FIG. 2 schematically shows one possible embodiment of a device according to the invention for emptying transport bags conveyed in a suspended manner, in successive phases (a), (b), (c), (d) of a partial cycle.
Figure 2D:
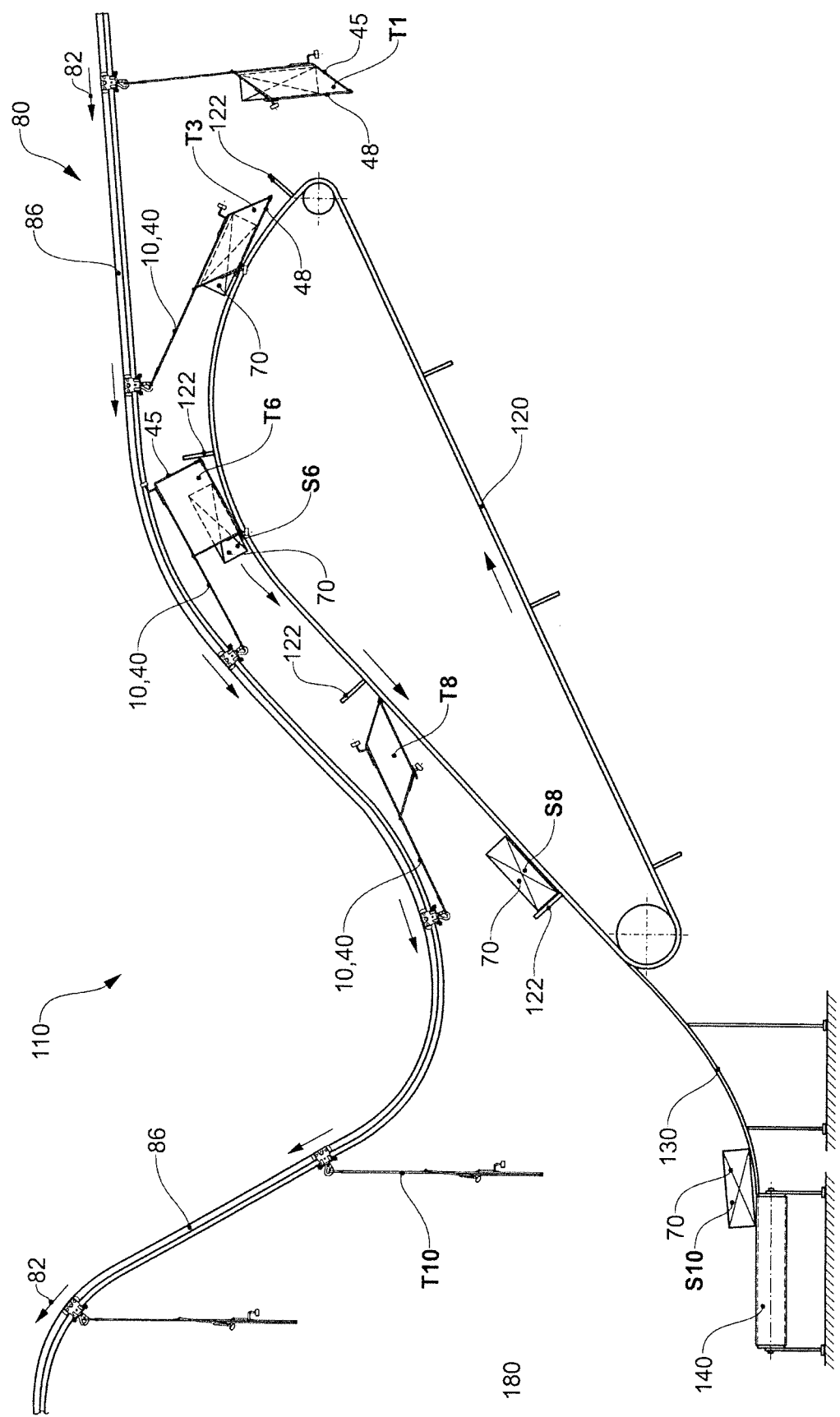

One possible embodiment of a device 110 according to the invention for emptying transport bags 40 conveyed in a suspended manner is illustrated in FIG. 2, in four different phases (a), (b), (c), (d) of the continuous overall process. The various procedures during operation of the device are explained below. The device 110 allows the automated emptying of transport bags 40 during continuous operation, as well as the clocked relaying of the removed piece goods 70 for further processing.

The illustrated emptying device 110 is part of a conveying system 80 for the suspended conveying of transport bags 40. Such a conveying system may be designed as a transport chain conveyor or as a gravity-driven suspension conveyor facility. In terms of function, this is not relevant for the device 110 according to the invention, since in any case, the individual conveying units 10 together with the transport bags 40 are forcibly conveyed at a specified constant speed in the area of the emptying device 110. In the case of a gravity-driven suspension conveyor facility, this takes place by means of a conveyor chain system (not illustrated) which runs parallel to the rail 86 and carries the individual carriages 20 together with the transport bags 40 along the conveying path of the conveying system 80.

The conveying path of the conveying system 80 runs from right to left in the conveying direction 82. A conveyor belt 120 that circulates in the counterclockwise direction and whose tangential conveying speed is the same as the conveying speed of the conveying system 80 is situated below the conveying system. Transversal ribs 122 are situated on the conveyor belt 120 at regular intervals along the circumference.

In a first step, a supplied transport bag 40 is placed on the conveyor belt 120 and transferred into a state in which the goods may be removed from the pocket. A filled transport bag 40, T1 is supplied from the right (FIGS. 2(*c*), (*d*)). The front wall of the pocket is pulled downwardly by the intrinsic weight of the front wall, the base section, and the piece good, so that the distance between the rear wall and the front wall is minimal within the scope defined by the piece good.

The front side 48 of the pocket 40, T2, namely, the front wall 44, ultimately meets the circulating conveyor belt 120 (FIGS. 2(*a*), (*b*)), and is swiveled to the rear in relation to the conveying direction 82. This marks the beginning of a contact section 111 of the device 110.

The conveyor belt 120 in this section has an inclination that becomes increasingly flatter, while the rail of the conveying system 80 has a constant slope to the left. This results in a smaller horizontal speed component for the conveyor belt than for the conveying system. Lastly, toward the end of the contact section 111 the conveying path of the conveyor belt 120 and the conveying path of the conveying system 80 run essentially parallel, and the horizontal speed components have adapted to one another.

It is noted that the absolute speeds of the conveyor belt and the conveying system are the same and do not change. Only the horizontal speed components differ at the various positions along the conveying path.

The distances between the transversal ribs 122 essentially correspond to the distances between the carriages 20 on the conveying system 80. The relative phase shift of the ribs 122 in relation to the carriages 20 is selected in such a way that a rib in the contact section runs behind the transport bag 40, T3 (FIGS. 2(*c*), (*d*), (*a*)), and slowly catches up with the transport bag 40 until the rib ultimately reaches the base section 45 of the transport bag 40, T4 (FIG. 2(*b*)). In this area, the rib moves more quickly horizontally than does the transport bag, whose carriage has already reached an area of an increasing slope. The rib 122 now pushes the base section 45 of the pocket 40, T5 forward (FIG. 2(*c*)), so that the distance between the front wall 44 and the rear wall 42 is increased, and at the end of the contact section 111 the transport bag 40 ultimately assumes a state in which the transport bag 40, T6 is open to the maximum extent and may be emptied (FIG. 2(*d*)). This marks the end of the contact section 111 and the beginning of the transfer section 113 of the device 110.

In the transfer section 113, the conveying paths of the conveying system 80 and of the conveyor belt 120 run parallel to one another with a certain slope. The conveying system 80 and the conveyor belt 120 have identical horizontal and vertical speed components. A piece good unit 70, S6, S7 present in the transport bag begins to slide out of the transport bag 40, T6, T7 and beneath the conveyor belt 120 (FIGS. 2(*d*), (*a*), (*b*), (*c*)), until ultimately the piece good unit 70, S8 reaches the transversal rib 122 traveling in front, and is stopped by same (FIGS. 2(*d*), (*a*)).

Meanwhile, the emptied transport bag 40, T7, T8 is once again lifted slowly from the conveyor belt 120, since the conveying path of the conveying system swivels upwardly away from the conveying path of the conveyor belt 120 (FIGS. 2(*c*), (*d*), (*a*)). This marks the end of the transfer section 113 and the beginning of the separating section 115 of the device 110. Lastly, the empty transport bag 40, T9 is lifted from the conveyor belt 120 (FIG. 2(*b*)). The empty transport bag 40, T10 now swivels back into the freely suspended position, and is carried away upwardly and to the left (FIGS. 2(*c*), (*d*), (*a*), (*b*)) for reuse in the conveying system 80.

Meanwhile, the transversal rib together with the piece good unit 70, S8 resting thereon reaches the end of the conveyor belt 120 (FIG. 2(*a*)).

The transversal ribs 120 are advantageously made up of a plurality of outwardly protruding fingers (not visible in FIG. 2) which run through corresponding slots (not visible) in a chute 130 directly adjoining the conveyor line. In this way, the piece good units 70, S9 are transferred to the chute 130 in a clocked manner as soon as the fingers of the ribs 120 are swiveled through the slots in the chute 130 upon reaching the deflection roller 124, and no longer hold back the piece good (FIG. 2(*b*)).

The piece good unit 70, S10, driven by gravity, slides beneath the chute 130 and ultimately lands on a further conveyor 180 (FIGS. 2(*c*), (*d*), (*a*)), in the example shown, a conveyor belt 140 or a roller conveyor that carries the piece good away, transverse to the chute, for further processing.

The device shown has the particular advantage that the automatic emptying of the transport bags takes place continuously. Another advantage is the option for further processing of the removed piece good units in a clocked manner.

Figure 3:
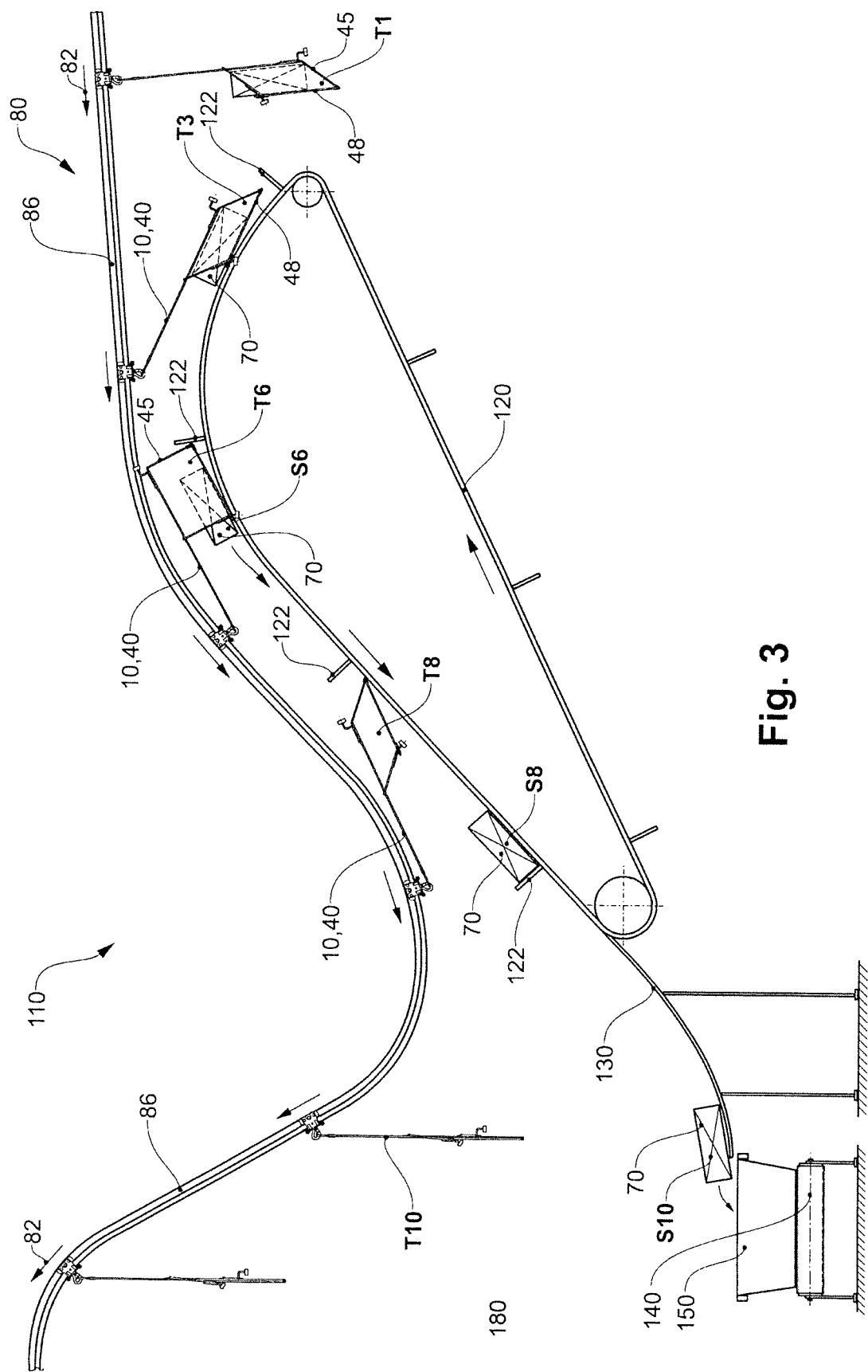
FIG. 3 schematically shows another possible embodiment of a device according to the invention.

Another possible embodiment of a device according to the invention is schematically depicted in FIG. 3. The shown embodiment of the device 110 differs from the device shown in FIG. 2 in regard to the nature of the further conveyor 180. For features of the device 110 that are identical to the embodiment of FIG. 2, reference is made to the corresponding discussion above.

The further conveyor 180 is arranged downstream of the chute 130 and may be realized as a belt conveyor or roller conveyor 140. The belt or roller conveyor 140 of the further conveyor 180 extends horizontally, with its conveying path perpendicular to the conveying path of the conveyor belt 120 and the chute 130. Alternatively, the further conveyor 180 may also be oriented in any other angle in regard to the chute, in particular in parallel to the chute. It is also possible that the chute 130 comprises a curve in the horizontal direction.

The further conveyor 180 in the shown embodiment comprises a receptacle 150 for receiving a piece good unit 70 sliding down the chute. The receptacle 150 is realized in the form of an open container, for example a plastic box, that seated on the belt or roller conveyor 140. The receptacle 150 may receive one or more piece good units obtained from one or more transport bags 40. Thus, it is possible to collect in a certain receptacle 150 a group of piece good units retrieved from a set of transport bags that following each other on the conveying system 80.

Once the receptacle 50 has received the intended one or more piece good units 70, it is conveyed on the belt or roller conveyor 140 of the further conveyor 180 toward its intended destination, where its content can be further processed, for example by placing it into a transport container for subsequent distribution. The receptacle may also be transferred to into a storage system. The receptacle container may be handled manually, or automatically, for example by a pushing actuator or a robot arm.

Figure 4:
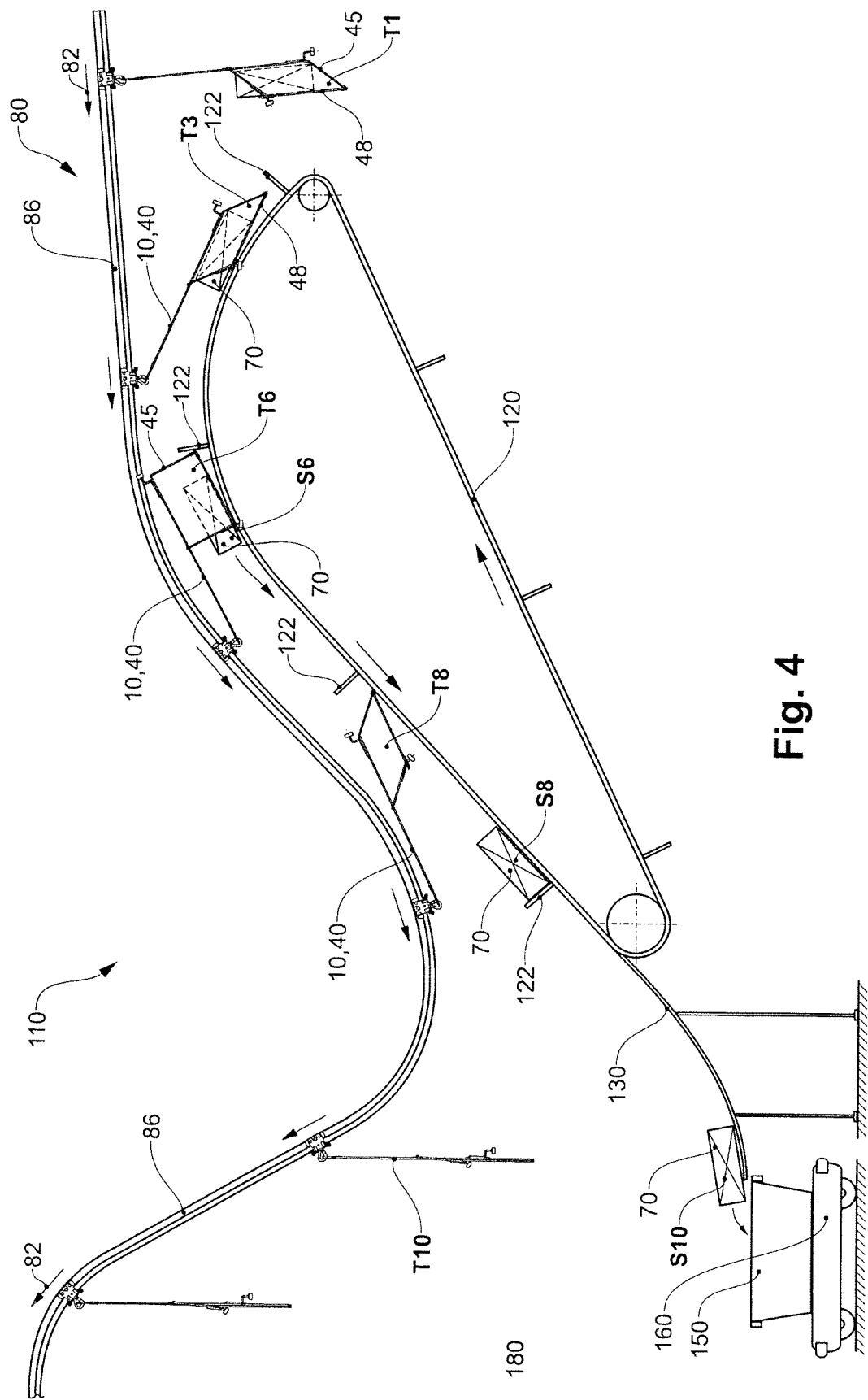
FIG. 4 schematically shows a further possible embodiment of a device according to the invention.

The further conveyor 180 can also be realized as an independently movable carrier unit 160, as described in FIG. 4 for another advantageous embodiment of a device according to the invention. Again, only features differing from FIG. 2 are discussed, and for the other features, reference is made to the corresponding discussion of FIG. 2.

The independently movable carrier unit 160 is advantageously be realized as an autonomous vehicle with a support platform for receiving a receptacle 150. In the shown embodiment, the carrier unit 160 of the further conveyor 180, carrying a receptacle in the form of an open box 150, is placed at a loading position at the end of the chute 130. Piece good units 70 sliding down the chute 130 will fall into the receptacle 150.

Once the intended one or more piece good units 70 are in the receptacle 150, the autonomous vehicle 160 of the further conveyor 180 leaves the loading position. The autonomous vehicle 160 then moves to an intended destination, carrying the receptacle 150 with the loaded piece good units. At the destination point, the receptacle 150, or its contents 70, respectively, are processed analogously to FIG. 3.

The autonomous vehicle comprises its own, autonomous control unit for moving freely on the ground. Advantageously, the autonomous vehicle also comprises suitable sensor elements that provide the integrated control unit with the necessary information and data.

Instead of an autonomous vehicle that may move freely on the ground and comprises its own, autonomous control unit, a carrier unit of the further conveyor 180 may also be realized as a vehicle that follows a predefined path, or it may be remotely controlled.

Figure 5:
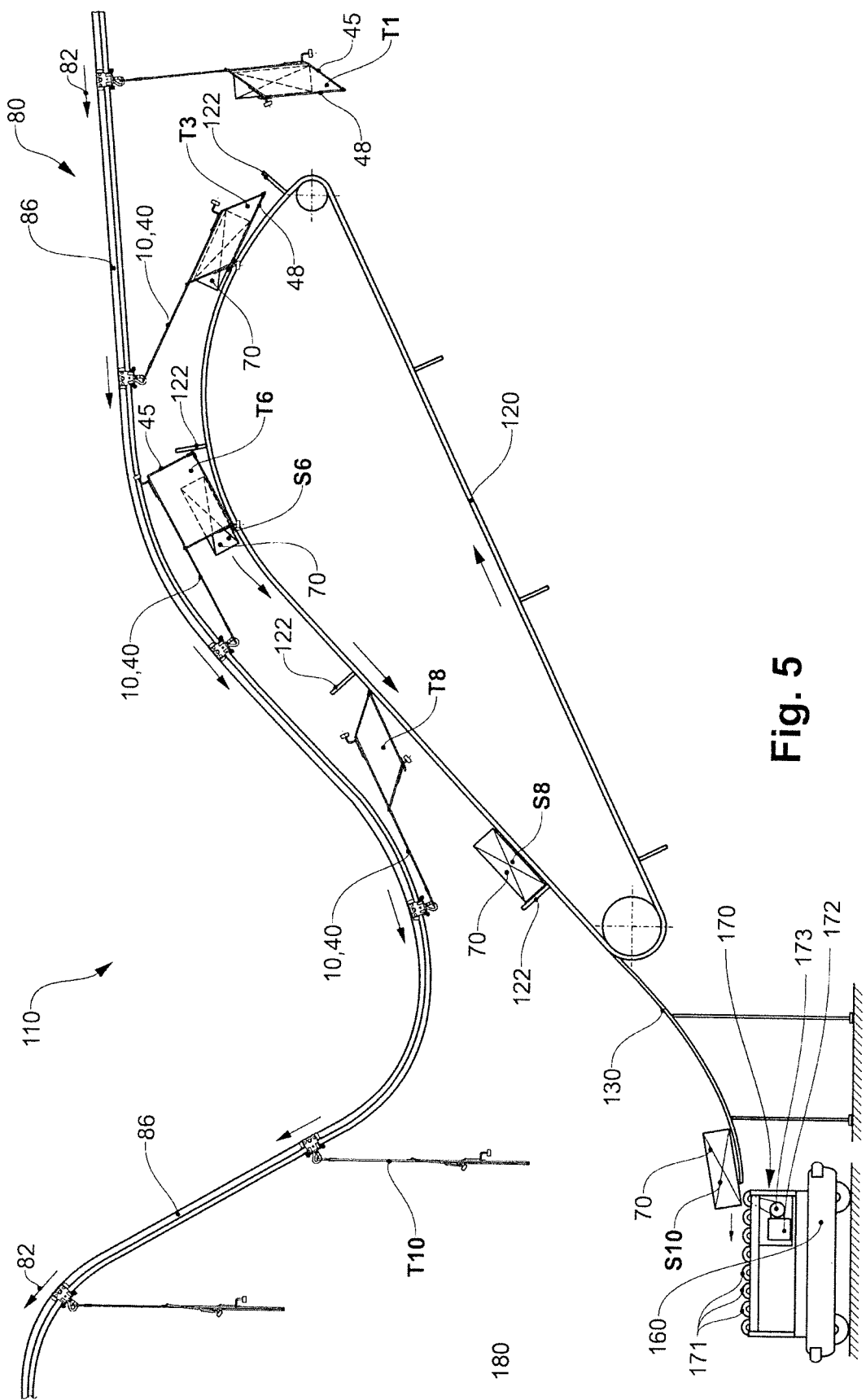
FIG. 5 schematically shows yet another possible embodiment of a device according to the invention.

FIG. 5 describes another advantageous embodiment of a device according to the invention, where the further conveyor 180 comprises a carrier unit 160 with an integrated roller conveyor 170. The carrier unit is realized as an autonomous device. The integrated roller conveyor 170 comprises a motor 172 with a wheel 173, which actuates over a V-belt a first roll 171 of the roller conveyor 170. The remaining rolls 171 of the roller conveyor are actuated by the first, driven roll, for example via a v belt.

When a piece good unit 70 sliding down the chute 130 reaches the carrier unit 160 located on the loading position at the end of the chute, the actuated rolls 171 move the received piece good unit into the middle of the support platform given by the multitude of rolls 171.

Advantageously, the carrier unit 160 comprises sensor elements for detecting the position of a piece good unit on the roller conveyor 170. Such data allow an integrated control unit of the carrier unit 160 or of the roller conveyor 170 to control the actuated rolls 171 and to correctly position the piece good unit 70 on the carrier device.

The carrier unit 160 of the further conveyor 180, with the retrieved piece good unit 70 placed on the platform 171 of the roller conveyor 170, can then drive to an intended destination point. At this destination, the roller conveyor 170 can then be used to unload the carrier unit 160.

The scope of the present invention is not limited to the specific embodiments described herein. Rather, the description and the associated figures, in addition to the examples disclosed herein, result in various further modifications of the present invention for those skilled in the art, which likewise are encompassed by the protective scope of the claims. Furthermore, various references are cited in the description, the disclosed content of which is hereby fully incorporated by reference into the description.

What is claimed is:

1. A device for emptying transport bags conveyed in a suspended manner, the device comprising:
   a conveying system via which transport bags may be supplied in a suspended manner along a conveying path, the transport bags having a pocket that is open at the top when in the filled state and has a front side;
   a circulating conveyor belt for receiving piece good units transported in the transport bags, wherein in a contact section, the conveying path of the conveying system and the conveying path of the conveyor belt are situated relative to one another in such a way that the distance between the conveying path of the conveying system and the conveying path of the conveyor belt becomes continuously smaller, so that when a transport bag is conveyed along the contact section, the front side of the pocket of the transport bag contacts and comes to rest on the conveyor belt, and the transport bag is thereby pivoted backwards;
   a chute that adjoins the conveyor belt, such that piece good units present on the conveyor belt are subsequently further conveyed onto the chute, driven by gravity; and
   a further conveyor that receives the piece good units from the chute.

2. The device according to claim 1, wherein the further conveyor is realized as a horizontal conveyor.

3. The device according to claim 1, wherein the further conveyor is realized as a conveyor system comprising one or more independently movable carrier units for conveying the received piece good units to a certain destination point.

4. The device according to claim 1, wherein the further conveyor comprises one or more receptacles for receiving piece good units from the chute, in particular containers or boxes.

5. The device according to claim 1, wherein in a transfer section the conveying path of the conveying system and the conveying path of the conveyor belt run downwardly in parallel to one another with a certain slope, and during the conveying, the front side of the pocket of a transport bag continues to lie along the transfer section on the conveyor belt, so that the opening in the pocket of the transport bag is oriented obliquely downwardly, and piece good units that are present in the pocket of the transport bag, driven by gravity, slide from the pocket onto the conveyor belt.

6. The device according to claim 5, wherein in a separating section the distance between the conveying path of the conveying system and the conveying path of the conveyor belt becomes continuously larger, so that during the conveying of a transport bag along the separating section, the emptied transport bag is lifted from the conveyor belt and swivels back into the freely suspended position.

7. The device according to claim 5, wherein a position of the ribs and of the transport bags relative to one another is selected in such a way that in the contact section a rib catches up with the transport bag, contacts the base section of the transport bag, and pushes it forward in a conveying direction until the transport bag is transferred into a state for emptying.

8. The device according to claim 5, wherein a distance between the ribs is selected in such a way that during the conveying of a transport bag along the transfer section, piece good units that are present in the pocket of the transport bag, driven by gravity, slide from the pocket onto the conveyor belt, and slide further downwardly on the conveyor belt with assistance from gravity until they are intercepted and held by the rib preceding the transport bag.

9. The device according to claim 5, wherein the ribs of the conveyor belt are made up of a plurality of parallel fingers.

10. The device according to claim 9, wherein an upper end of the chute adjoining the conveyor belt has slots whose positions correspond to the fingers of the ribs of the conveyor belt, so that when the conveyor belt is deflected, the fingers of the ribs and the slots of the chute intermesh with one another, and in each case piece good units held back behind a rib are released in a clocked manner and, driven by gravity, are subsequently further conveyed on the chute.

11. The device according to claim 10, wherein the further conveyor receives the released piece good units from the chute.

12. The device according to claim 1, wherein the conveying speeds of the conveyor belt and of the conveying system are the same.

13. The device according to claim 1, wherein the conveyor belt has a plurality of outwardly directed transversal ribs that are uniformly spaced along the circumference of the conveyor belt.

14. The device according to claim 1, wherein the transport bags have a reinforced rear wall.

15. The device according to claim 1, wherein the transport bags include a rear wall and a front wall that are flexibly joined together via a base section in such a way that they are movable back and forth between a first state in which they form a pocket that is open and fillable at the top, and a second state in which they are situated close together and form a folded-up bag.

16. The device according to claim 15, wherein the rear wall is extended upwardly beyond a level of the front wall, with a support section for fastening the transport bag to the conveying element.

17. The device according to claim 1, wherein the further conveyor is realized as one of a belt conveyor, a shell conveyor, a roller conveyor, a trough conveyor, a cross-belt conveyor, and a horizontal sorter array.

18. The device according to claim 1, wherein the further conveyor is realized as a conveyor system comprising one or more independently moveable autonomous carrier vehicles.

* * * * *